(12) United States Patent
Wobben

(10) Patent No.: US 6,724,097 B1
(45) Date of Patent: Apr. 20, 2004

(54) METHOD FOR OPERATING A WIND FARM

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 146 days.

(21) Appl. No.: 10/089,812
(22) PCT Filed: Jul. 8, 2000
(86) PCT No.: PCT/EP00/06493
§ 371 (c)(1), (2), (4) Date: Jun. 27, 2002
(87) PCT Pub. No.: WO01/25630
PCT Pub. Date: Apr. 12, 2001

(30) Foreign Application Priority Data

Oct. 6, 1999 (DE) .......................................... 199 48 196

(51) Int. Cl.[7] .............................. F03D 9/00; G05D 11/00
(52) U.S. Cl. .......................... 290/44; 700/286; 700/291
(58) Field of Search ............................. 290/44; 700/286, 700/291

(56) References Cited

U.S. PATENT DOCUMENTS

| | | | |
|---|---|---|---|
| 4,400,659 A | * 8/1983 | Barron et al. | .................. 322/32 |
| 4,423,634 A | 1/1984 | Audenard et al. | |
| 4,556,801 A | * 12/1985 | Gervasio et al. | .............. 290/44 |
| 5,210,704 A | 5/1993 | Husseiny | |
| 5,845,230 A | 12/1998 | Lamberson | |
| 6,320,272 B1 | * 11/2001 | Lading et al. | ................. 290/44 |
| 6,512,966 B2 | * 1/2003 | Lof et al. | .................... 700/291 |

FOREIGN PATENT DOCUMENTS

| | | | | |
|---|---|---|---|---|
| EP | 0072598 A1 | * | 2/1983 | |
| EP | 0 465 696 | | 1/1992 | |
| GB | 1514995 | * | 7/1978 | |
| GB | 2007926 A | * | 5/1979 | ............. H02J/4/00 |
| JP | 10301603 A | * | 11/1998 | ........... G05B/13/02 |
| WO | PCT/DE81/00092 | | 6/1981 | |
| WO | WO 9007823 A1 | * | 7/1990 | ............. F03D/7/04 |
| WO | WO 9745908 A1 | * | 12/1997 | ............. H02J/3/38 |
| WO | PCT/DK99/00020 | | 1/1999 | |
| WO | WO0177525 A1 | * | 10/2001 | |

OTHER PUBLICATIONS

"Auslegungsaspekte von Windenergiekonvertern", BWK, vol. 36 (1984) No. 12—Dec., pp. 522–525 (In German and In English).

* cited by examiner

Primary Examiner—Joseph Waks
(74) Attorney, Agent, or Firm—Neil A. Steinberg

(57) ABSTRACT

A method and apparatus for operating a wind park having maximum permissible output power and a plurality of wind power installations wherein each wind power installation includes an output power and a maximum rated output power. The apparatus, in one aspect, includes a processing unit that is coupled to the plurality of wind power installations to control the output power of at least one of the wind power installations. The processing unit may determine the total output power of all of the plurality of wind power installations and, in response thereto, control the output power of at least one of the plurality of wind power installation so that the total output power of all of the plurality of wind power installations does not exceed the maximum permissible output power of the wind park. The method for operating the wind park, in one aspect, includes determining the output power of the plurality of wind power installations and controlling the output power of at least one of the plurality of wind power installations by reducing the output power of at least one of the plurality of wind power installations if the total output power of all of the plurality of wind power installations exceeds the maximum permissible output power of the wind park.

21 Claims, 2 Drawing Sheets

METHOD FOR OPERATING A WIND FARM

Figure 1:
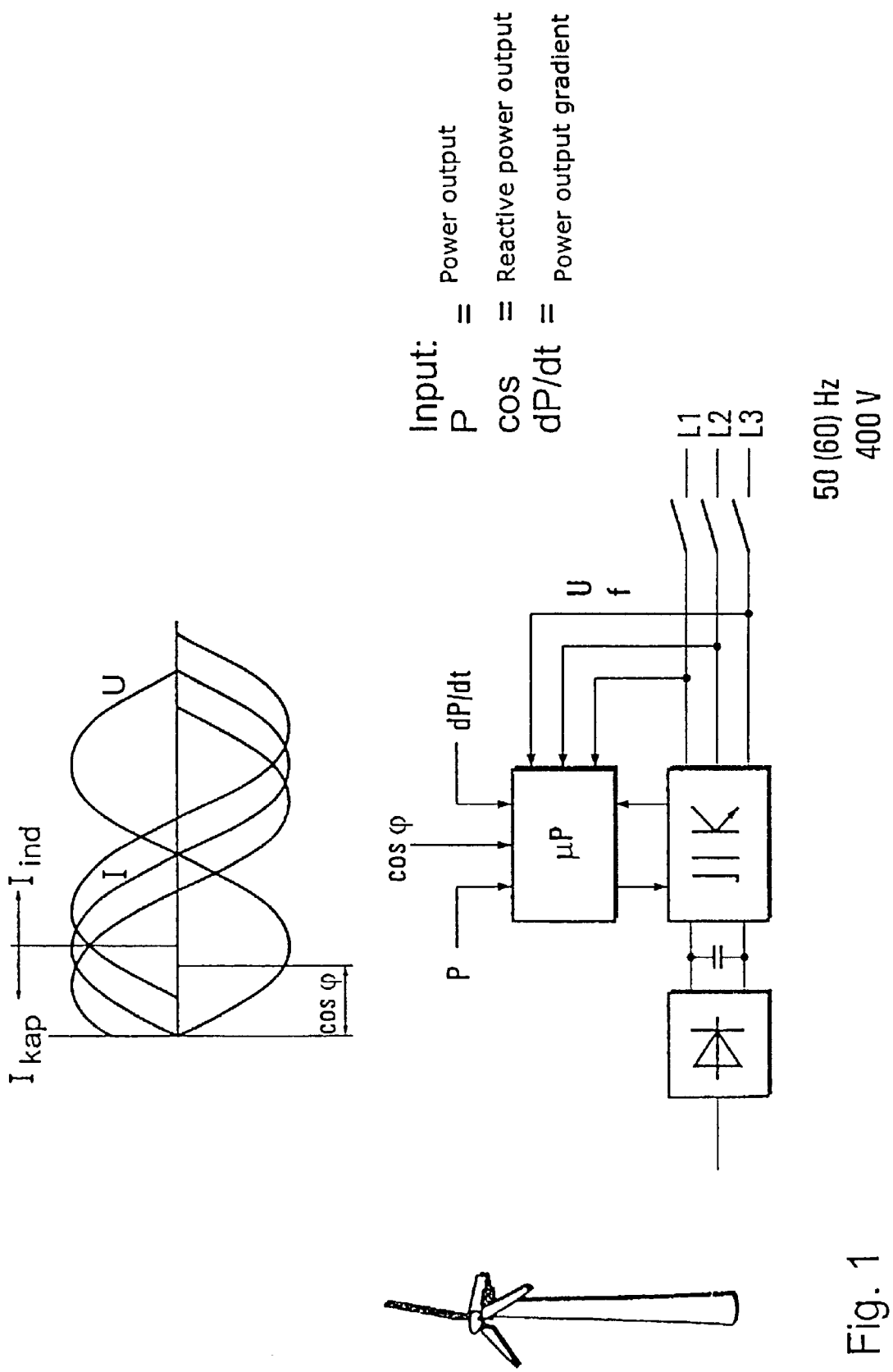

The invention concerns a method of operating a wind park and also a wind park as such.

Wind power installations were initially always set up as singular units and it is only in recent years that wind power installations have frequently been installed in wind parks, this being due also to administrative and building regulations. In that respect a wind park, in its smallest entity, is an arrangement of at least two wind power installations but frequently markedly more. By way of example mention may be made of the wind park at Holtriem (East Frisia in Germany), where more than 50 wind power installations are set up in an array. It is to be expected that the number and also the installed power output of the wind power installations will also rise greatly in future years. In most cases the wind potential is at its greatest in regions of the power supply networks with a low short-circuit capacity and a low level of population density. It is precisely there that the technical connection limits are rapidly attained by the wind power installations, with the consequence that no further wind power installations can then be set up at such locations.

A conventional wind park which is connected for example to a 50 MW substation can therefore have at a maximum only 50 MW total power output, that is to say for example 50 wind power installations each involving a rated power output of 1 MW.

Bearing in mind the fact that the wind power installations are not constantly operated at the rated level and thus the entire wind park also does not continuously reach its maximum power output (rated power output), it can be established that the wind park is not put to optimum use if the rated power output of the wind park corresponds to the maximum possible total power output which is to be fed in.

The invention accordingly proposes a solution in which the wind park is equipped with a total power output which is higher than the maximum possible network feed-in power output. When applied to the above-indicated example, the power output can be raised to a value of over 50 MW, for example 53 MW. As soon as the wind speeds are sufficiently high to produce a limit power output of 50 MW, the wind park regulation in accordance with the invention comes into operation and regulates down individual ones of or all installations when the total maximum power output is exceeded, in such a way that same is always observed. This means that, at wind speed above nominal or rated wind (wind speed at which a wind power installation reaches its rated power output), at least one or all installations is or are operated with a (slightly) throttled power output (for example with a power output of 940 kW instead of 1 MW).

The advantages of the invention are apparent. Considered overall the network components of the feed network (network components are for example the transformer and the lines) are utilized or loaded in the optimum fashion (utilization up to the thermal limit is also a possibility). This means that existing wind park areas can be better utilized, by virtue of setting up a maximum possible number of wind power installations. That number is then no longer (so severely) limited by the existing network capacity.

For the purposes of control/regulation of a wind power installation, it is desirable if it has a data input, by means of/by way of which the electric power output can be adjusted in a range of between 0 and 100% (with respect to the rated power output). If for example a reference value of 350 kW is applied to that data input, the maximum power output of that wind power installation will not exceed the reference value of 350 kW. Any value between 0 and the rated power output (for example from 0 to 1 MW) is possible as the reference value.

That data input can be used directly for power output limitation purposes.

It is however also possible by means of a regulator to regulate the generator output in dependence on the network voltage (in the wind park network or in the feed network).

A further important function is discussed hereinafter with reference to wind park regulation. It will be assumed by way of example that a wind park comprises 10 wind power installations which each have a rated power output of 600 kW. By virtue of the capacitances of the network components (line capacitances) or the limited capacitances in the substation it will further be assumed that the maximum power output to be delivered (limit power output) is limited to 5200 kW.

There is now the possible option of limiting all wind power installations to a maximum power output of 520 kW by means of the reference value (data input). That satisfies the requirement for limiting the power output to be delivered.

Another possible option involves not exceeding the maximum power output, as the sum of all installation, but at the same time generating a maximum amount of power (kW-hours (work)).

In that respect, it should be known that, at low to moderate wind speeds, within the wind park, it frequently comes about that the wind power installations at the favorable (good) locations (these are the locations at which the wind impinges first within the wind park) receive a great deal of wind. If now all wind power installations are simultaneously regulated down to their throttled value (for example all to 520 kW), that generated power output is admittedly attained by some wind power installations which are disposed at good locations, but some other wind power installations which stand in the "wind shadow" of the well-located wind power installations (being in the second and third rows) receive less wind and as a result operate for example only with a power output of 460 kW and do not reach the value of the maximum throttled power output at 520 kW. The total power output generated in the wind park is accordingly substantially below the permitted limit power output of 5200 kW.

In this case the wind park power output regulation procedure according to the invention regulates the individual installations in such a way that the maximum possible energy yield occurs. This means in specific terms that for example the installations in the first row (that is to say at good locations) are regulated to a higher power output, for example to the rated power output (that is to say no throttling action). This means that the overall electrical power output in the wind park rises. The park regulation arrangement however regulates each individual installation in such a way that the maximum permitted electrical connection power output is not exceeded while at the same time the work produced (kWh) reaches a maximum value.

The wind park management according to the invention can be easily adapted to the respective situations which arise. Thus it is very easily possible for example to implement different throttling of the power output of individual installations if an individual installation or a plurality of installations of a wind park are (have to be) taken off the network, if either for maintenance reasons or for other reasons and an individual installation or a plurality of installations have to be temporarily shut down.

For control/regulation of the wind park or the individual installations, it is possible to use a data/control processing apparatus which is connected to the data inputs of the installations and which, from the wind speeds which are ascertained (in respect of each installation), ascertains the respectively most advantageous power output throttling value for an individual installation or the entire wind park respectively.

FIG. 1 is a block circuit diagram showing control of a wind power installation by means of microprocessor $\mu P$ which is connected to an inverter arrangement (PWR), by means of which polyphase alternating current can be fed into a power supply network. The microprocessor has a power entry input P, an input for inputting a power factor (cos $\phi$) and an input for inputting the power gradient (dP/dt).

The inverter arrangement comprising a rectifier, a rectifier intermediate circuit and an inverter is connected to the generator of a wind power installation and receives therefrom the energy produced by the generator, in rotary speed-variable fashion, that is to say in dependence on the speed of rotation of the rotor of the wind power installation.

The design configuration shown in the Figures serves to explain how the power output from a wind power installation can be limited in respect of its magnitude to a maximum possible network feed value.

Figure 2:
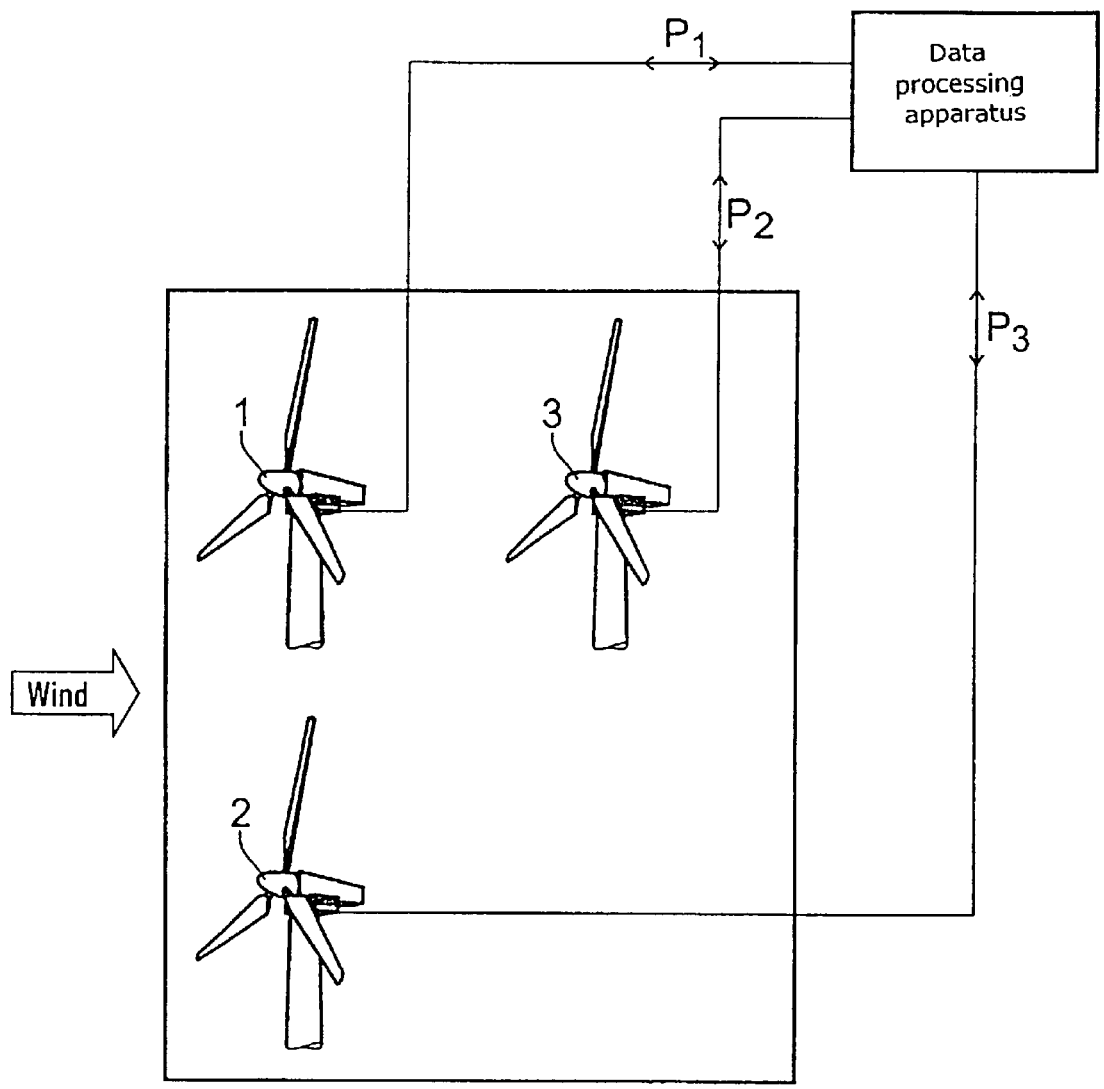

FIG. 2 is a view illustrating the principle of a wind park comprising for example three wind power installations 1, 2 and 3 of which—as viewed from the direction of the wind—two are disposed in side-by-side relationship and the third is positioned behind the first two. As each of the individual wind power installations has a power input for setting the power output of the respective installation (FIG. 1), the power output levels of an individual wind power installation can be set to a desired value by means of a data processing apparatus, by means of which the entire wind park is controlled.

In FIG. 2 the advantageous locations of the wind power installations are those on which the wind impinges first, that is to say the installations 1 and 2.

What is claimed is:

1. A method of operating a wind park, the wind park having a maximum permissible output power, wherein the wind park includes a plurality of wind power installations, each wind power installation having an output power and a maximum rat d output power, the method comprising:
   determining the output power of the plurality of wind power installations, and
   controlling the output power of at least one of the plurality of wind power installations including,
      reducing the output power of at least one of the plurality of wind power installations if the total output power of all of the plurality of wind power installations exceeds the maximum permissible output power of the wind park.

2. The method of claim 1 wherein the plurality of wind power installations are arranged in at least a first row and a second row, and wherein controlling the output power of at least one of the plurality of wind power installation further includes maintaining the output of each wind power installation in the first row at substantially its maximum rated output power and controlling the output power of at least one wind power installation in the second row so that the output power of the wind park is substantially equal to the maximum permissible power output of the wind park.

3. The method of claim 1 wherein the plurality of wind power installations are arranged in at least a first row and a second row, and wherein controlling the output power of at least one of the plurality of wind power installation further includes maintaining the output of each wind power installation in the first row at substantially its maximum rated output power and controlling the output power of at least one wind power installation in the second row so that the output power of the wind park does not exceed the maximum permissible power output of the wind park.

4. The method of claim 1 wherein the plurality of wind power installations are arranged in at least a first row and a second row, and wherein controlling the output power of at least one of the plurality of wind power installation further includes controlling the output power of the wind power installations so that the output power of each wind power installation in the first row is greater than the output power of each wind power installation in the second row and the output power of the wind park does not exceed the maximum permissible power output of the wind park.

5. The method of claim 1, wherein the plurality of wind power installations are arranged in at least a first row, a second row and a third row, and wherein controlling the output power of at least one of the plurality of wind power installation further includes maintaining each wind power installation in the first row at substantially its maximum rated output power and controlling the output power of a plurality of the wind power installations in the second and third rows so that the output power of the wind park does not exceed the maximum permissible power output of the wind park.

6. The method of claim 1 wherein the plurality of wind power installations are arranged in at least a first row, a second row and a third row, and wherein controlling the output power of at least one of the plurality of wind power installation further includes maintaining the output power of each wind power installation in the first row at substantially a maximum rated output power and controlling the output power of a plurality of the wind power installations in the second and third rows so that the output power of the wind park is substantially equal to the maximum permissible power output of the wind park.

7. The method of claim 1 wherein the plurality of wind power installations are arranged in at least a first row, a second row and a third row and wherein controlling the output power of at least one of the plurality of wind power installation further includes controlling the output power of the wind power installations so that the output power of a plurality of wind power installations in the first row is greater than the output power of each wind power installation in the second and third rows and the output power of the wind park does not exceed the maximum permissible power output of the wind park.

8. The method of claim 1 wherein the plurality of wind power installations are arranged in at least a first row and a second row, and wherein controlling the output power of at least one of the plurality of wind power installation further includes controlling the output power of wind power installations so that the output power of all of the wind power installations in the first row are greater than the output power of all of the wind power installations in the second row and the output power of the wind park does not exceed the maximum permissible power output of the wind park.

9. The method of claim 1 further including:
   removing at least one wind power installation from the plurality of wind pow r installations; and
   wherein controlling the output power of at least one of the plurality of wind power installations further includes controlling the output power of at least one of the remaining wind power installations of the plurality of the wind power so that the output power of the wind park does not exceed the maximum permissible power output and the output power of the at least one of the remaining wind power installations does not exceed its maximum rated power.

10. The method of claim 1 further including:
removing at least one wind power installation from the plurality of wind power installations; and
wherein controlling the output power of at least ore of the plurality of wind power installations further includes controlling the output power of at least one of the remaining wind power installations of the plurality of the wind power so that the output power of the wind park is substantially equal to the maximum permissible power output and the output power of the at least one of the remaining wind power installations does not exceed its maximum rated power.

11. The method of claim 1 wherein controlling the output power of at least one of the plurality of wind power installations further includes increasing the output power of at least one of the plurality of wind power installations, but not exceeding the maximum rated power of the at least one remaining wind power installation, if the total output power of all of the plurality of wind power installations is less than the maximum permissible output power of the wind park.

12. The method of claim 1 wherein controlling the output power of at least one of the plurality of wind power installations further includes controlling the output power of all of the wind power installations so that the output power of the wind park is substantially equal to the maximum permissible power output and the output power of the wind power installations do not exceed the maximum rated power.

13. A wind park for producing output power, wherein the wind park has a maximum permissible output power, the wind park comprising:
a plurality of wind power installations, each wind power installation having an output power and a maximum rated output power;
a processing unit, coupled to the plurality of wind power installations, to control the output power of at least one of the wind power installations, wherein the processing unit determines the total output power of all of the plurality of wind power installations and, in response thereto, controls the output power of at least one of the plurality of wind power installations so that the total output power of all of the plurality of wind power installations does not exceed the maximum permissible output power of the wind park.

14. The wind park of claim 13 wherein the processing unit, in response to the total output power of all of the plurality of wind power installations, increases the output power of at least one of the plurality of wind power installations, but does not exceed the maximum rated power of the at least one of the plurality of wind power installations, if the total output power of all of the plurality of wind power installations is less than the maximum permissible output power of the wind park.

15. The wind park of claim 13 wherein the processing unit, in response to the output power of all of the plurality of wind power installations, reduces the output power of at least one of the plurality of wind power installations if the total output power of all of the plurality of wind power installations exceeds the maximum permissible output power of the wind.

16. The wind park of claim 13 wherein the plurality of wind power installations are arranged in at least a first row and a second row, wherein the processing unit maintains the output power of each wind power installations in the first row at substantially its maximum rated output power and controls the output power of at least on wind power installation in the second row so that the output power of the wind park is substantially equal to the maximum permissible power output of the wind park and wherein the at least one wind power installation does not exceed its maximum rated power.

17. The wind park of claim 13 wherein the plurality of wind power installations are arranged in at least a first row and a second row, wherein the processing unit maintains the output power of each wind power installation in the first row at substantially its maximum rated output power and controls the output power of at least one wind power installation in the second row so that the output power of the wind park does not exceed the maximum permissible power output of the wind park and the at least one wind power installation does not exceed its maximum rated power.

18. The wind park of claim 13 wherein the processing unit, in response to removing at least one wind power installation from the plurality of wind power installations, controls the output power of at least one of the remaining wind power installations of the plurality of the wind power so that the output power of the wind park does not exceed the maximum permissible power output of the wind park end the output power of the at least one of the remaining wind power installation does not exceed its maximum rated power.

19. The wind park of claim 13 wherein the processing unit, in response to removing at least one wind power installation from the plurality of wind power installations, controls the output power of at least one of the remaining wind power installations of the plurality of the wind power so that the output power of the wind park does is substantially equal to the maximum permissible power output and the output power of the at least one of the remaining wind power installation does not exceed its maximum rated power.

20. A method of operating a wind park, the wind park having a maximum permissible output power, wherein the wind park includes a plurality of wind power installations, each wind power installation having an output power and a maximum rated output power, and wherein the plurality of wind power installations are arranged in at least two groups including a first group and a second group, the method comprising:
controlling the output power of the first group of wind power installations so that each wind power installation of the first group provides an output power that is substantially equal to its maximum rated output power;
controlling the output power of the second group of wind power installations including reducing the output power of at least one of the plurality of wind power installations in the second group of wind power installations if the total output power of the plurality of wind power installations exceeds the maximum permissible output power of the wind park.

21. The method of claim 20 wherein controlling the output power of the second group of wind power installations further includes increasing the output power of at least one of the plurality of wind power installations in the second group of wind power installations, but does not exceed the maximum rated power of the at least one of the plurality of wind power installations in the second group, if the total output power of all of the plurality of wind power installations is less than the maximum permissible output power of the wind park.

* * * * *

UNITED STATES PATENT AND TRADEMARK OFFICE
CERTIFICATE OF CORRECTION

PATENT NO. : 6,724,097 B1
DATED : April 20, 2004
INVENTOR(S) : Wobben

It is certified that error appears in the above-identified patent and that said Letters Patent is hereby corrected as shown below:

Column 3,
Line 43, delete "rat d" and substitute -- rated --.

Column 4,
Line 61, delete "pow r" and substitute -- power --.

Column 5,
Line 7, delete "ore" and substitue -- one --.

Signed and Sealed this

Twenty-third Day of November, 2004

JON W. DUDAS
*Director of the United States Patent and Trademark Office*